United States Patent [19]

Yu et al.

[11] Patent Number: 4,496,979
[45] Date of Patent: Jan. 29, 1985

[54] FM HIGH-FIDELITY PROCESSOR

[75] Inventors: Hong Yu; Sai W. Kwok, both of Nashua, N.H.

[73] Assignee: Casat Technology, Inc., Nashua, N.H.

[21] Appl. No.: 554,446

[22] Filed: Nov. 22, 1983

[51] Int. Cl.$^3$ .............................................. H04N 5/62
[52] U.S. Cl. .................................. 358/197; 358/144; 358/198; 358/904; 381/1; 381/17; 455/207; 455/209; 455/214
[58] Field of Search ............... 358/197, 198, 180, 144, 358/191.1, 188, 189, 904, 143; 455/180, 209, 207, 208, 214; 381/1, 3, 4, 10, 17

[56] References Cited

U.S. PATENT DOCUMENTS

| | | | |
|---|---|---|---|
| 2,528,222 | 10/1950 | Foster | 358/189 |
| 3,118,970 | 1/1964 | Silver | 178/5.8 |
| 3,259,689 | 7/1966 | Sienkiewicz | 178/5.8 |
| 3,305,632 | 2/1967 | Court et al. | 455/207 |
| 3,590,382 | 6/1971 | Kenny | 325/36 |
| 4,021,737 | 5/1977 | Trask | 325/36 |
| 4,139,866 | 2/1979 | Wegner | 358/144 |
| 4,158,858 | 6/1979 | Janssen | 358/144 |
| 4,232,191 | 11/1980 | Matsuzuka | 455/209 |
| 4,270,212 | 5/1981 | Furukawa | 358/114 |
| 4,340,975 | 6/1982 | Onishi et al. | 358/191.1 |
| 4,348,691 | 9/1982 | Mistry | 358/114 |
| 4,410,864 | 10/1983 | Muterspaugh et al. | 358/188 |

OTHER PUBLICATIONS

"Intercarrier Buzz Phenomena Analysis and Cures" by Fockens et al., IEEE Transactions on Consumer Electronics; vol. CE-27, No. 3, Aug. 1981, pp. 381-395.
"TV Sound Tuner" by Graham, Radio Electronics; Jun. 1957, pp. 46-48.
"Enhance TV Sound with Stereo" by Cohen, Popular Electronics, vol. 20, No. 6, Jun. 1982, pp. 55-59.

Primary Examiner—Tommy P. Chin
Assistant Examiner—Michael D. Parker
Attorney, Agent, or Firm—Weingarten, Schurgin, Gagnebin & Hayes

[57] ABSTRACT

A processor providing high-quality audio signals from television sound channels by signal recovery using induced intermodulation between the picture carrier and the sound subcarrier signal. The resulting intermodulation products are filtered and the FM audio subcarrier is recovered and converted to the FM radio band. Subsequently the detected audio signal is enhanced by stereo synthesis and noise reduction systems, producing a high-quality reproduction of television audio signals with a minimum of distortion and noise, suitable for a full-range stereo system. The recovery of the audio subcarrier by inducing intermodulation between the signal carriers avoids the frequency shifts or phase noise induced by satellite and/or CATV translator circuits, in particular, the phase jitter of translating phase-lock loop (PLL) circuits. The converter is also applicable for use with VCR and other equipment to provide high-quality sound recovery.

10 Claims, 2 Drawing Figures

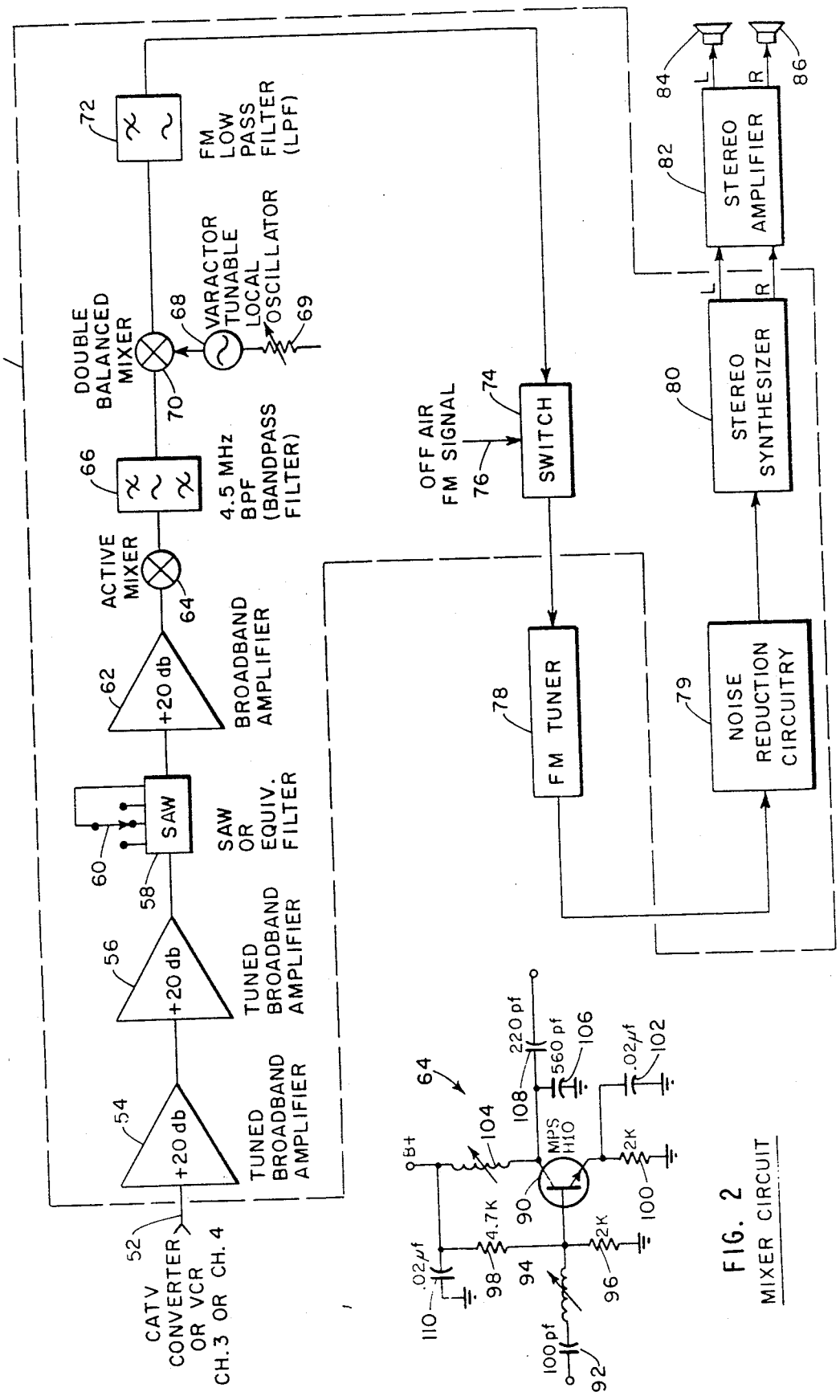

FM HIGH-FIDELITY PROCESSOR

FIELD OF THE INVENTION

The present invention relates to television converters, and in particular television converters providing high-quality frequency translation from television audio channels to FM channels for high-fidelity audio reproduction.

BACKGROUND OF THE INVENTION

The transmission of high-quality sound by frequency modulation (FM) or phase modulation (PM) originally included a relatively simple, straightforward signal path. The audio signal was received from a source and served to modulate a carrier frequency signal, which was transmitted by wire or through the air to a receiver which demodulated the signal to produce a relatively clean audio signal. However, as the number of signals increased, efficient channel allocation became a significant problem. A typical solution is to translate or convert the original carrier frequency of the original signal to a new frequency closely spaced with other signals, providing efficient transfer of many channels of data through a selected media of finite bandwidth. Frequently, the process of signal translation is applied several times. For instance, a local television signal may be translated to a microwave link frequency, which is then translated to a frequency to be received by a satellite. The satellite again converts the signal frequency, which is then reconverted back down to television VHF, UHF, or CATV signal, to be finally received by the local subscriber. In the example provided, the signal is combined or mixed with several local oscillator signals going upward in frequency, and again with several local oscillator signals to be converted down to baseband, each having their own phase jitter and frequency shift signal components. For systems using frequency or phase modulation, every source of phase jitter and frequency shift signal components caused by frequency translation and component aging further degrades the recovery of the modulated signal, resulting in a significant reduction in the final channel signal-to-noise ratio and dynamic range capability, with the phase jitter and frequency shift signals appearing as audible noise in the received signal. This signal degradation due to noise is particularly noticeable for limited frequency modulation deviation (less than 40 KHz deviation).

The audio signals, often of poor audio quality for the reason mentioned above, are considered noticeably less listenable in comparison to the high-quality FM, stereo signals when reproduced through a common high-fidelity system. Moreover, the monaural nature of most television audio signals makes the reproduction of television sound appear even more inferior. As a result, the usability of the audio portion of television signals, as well as any signals rebroadcast at a different frequency, is severely limited.

BRIEF DESCRIPTION OF THE INVENTION

The converter of the present invention translates the audio portion of a television signal to the FM radio band by mixing the video carrier with the audio subcarrier to produce a 4.5-MHz intermediate frequency (or 6 MHz IF commonly used in Europe), which is then translated to the FM broadcast band for subsequent audio frequency detection. Thereafter, the resulting audio is processed by a noise reduction system to increase the signal-to-noise ratio from the encoded TV audio signal and/or a stereo synthesizer to provide left and right channel signals. The resulting audio signals, when reproduced by a full-range high-fidelity system, are comparable to other high-fidelity stereophonic signal sources, providing a realistic life-like sound.

The television FM subcarriers recovered in this manner are immune to the added translating oscillator FM noise or phase jitter, regardless of the number of frequency translation stages used, and noise associated with frequency translation because of the constant IF frequency. The signals resulting from the conversion are received by a commercially available FM receiver, imposing a minimum burden in capital expenditure on both the consumer and the local CATV operator. Moreover, should the television broadcaster adopt a baseband subcarrier stereo modulation method, the signal resulting may be directly demodulated by the FM receiver stereo circuitry, or be externally demodulated by the appropriate circuits providing the highest quality stereo or monaural signal possible.

BRIEF DESCRIPTION OF THE DRAWING

These and other features of the present invention will be better understood by reading the following detailed description together with the drawing, wherein:

FIG. 1 is a block diagram of the converter as a high-fidelity FM processor of television audio signals; and FIG. 2 is a schematic drawing of the active mixer shown in FIG. 1.

DETAILED DESCRIPTION OF THE INVENTION

A block diagram of FIG. 1 includes the converter 50 according to the present invention, which provides a high-fidelity FM signal. A signal is received at the input 52 from a CATV, VCR, or other television signal source. The signal is then amplified by two tuned broadband amplifiers 54 and 56, each providing a 20-dB increase in signal amplitude. The signal provided by the broadband amplifiers 52 and 56 is restricted to include only the frequencies of channels 2, 3, and 4, where one is typically used as an output signal in the above-mentioned CATV or VCR sources. A highly selective bandpass filter 58 is used to eliminate two of the three channels, passing a single channel according to the operation of selector switch 60. The resulting passed signal is then amplified by a third broadband amplifier 62, providing a 20-dB increase in amplitude.

The output signal from the amplifier 62 is received by an active mixer 64. The selected television channel includes at least two carriers, a video carrier and a FM audio carrier signal. The amplitude of the signal provided by the broadband amplifier 62, typically −15 to 0 dBm, is sufficient to cause the mixer 64 to produce an output signal which includes the intermodulation products of the video and audio carrier signals of the selected television channel signal. Intermodulation products include signals produced at frequencies including the sum and difference between the carrier frequencies. For instance, a channel 3 signal has a video carrier at 61.25 MHz and an audio carrier at 65.75 MHz, the difference being at 4.5 MHz, and the sum at 127.0 MHz. Moreover, the adjacent channel carrier signals, and additional sum and difference signals of a higher (greater than second) order produced by the mixer, are not useful to the subsequent recovery process. Therefore, a 4.5-MHz bandpass filter 66 removes the signals except for the signal corresponding to the difference between the video and audio carrier signal frequencies of the selected channel. The 4.5-MHz signal provides an intermediate frequency (IF), which is converted to the FM frequency band by mixing a local oscillator (LO) signal, produced by local oscillator 68, in a double-balanced mixer 70, which results in a signal having a component in the frequency range of a commercially available high-fidelity FM tuner 78. The double-balanced mixer 70 has the characteristic of significantly reduced IF and LO signal leakage in the output signal spectrum. The local oscillator 68 is typically tunable over a range of ±1 MHz by a varactor diode controlled by a variable voltage control 69, to enable the subscriber to place the converter output signal at an unused FM channel frequency in case of strong local FM station interference. The mixer 70 output signal is filtered by a lowpass filter 72 to remove the unwanted signal components. The lowpass filter selectively removes the lower or difference between the local oscillator, typically 100 MHz, and the IF frequency, 4.5 MHz, providing a signal at approximately 95.5 MHz, within the range of the tuner 78. The tuner 78 may also receive off-the-air FM signals at the input 76 according to selected operation of an FM receiver input switch 74.

The FM tuner 78 provides a demodulated monaural baseband signal which may be encoded by any one of several noise reduction systems such as Dolby A, B, or C (Dolby is a trademark of Dolby Labs, Inc. of San Francisco, Calif.) or dbX dynamic range enhancer (dbX is a trademark of DBX Corporation of Waltham, Mass.). The baseband signal is decoded by the corresponding noise reduction circuitry 79 to improve the signal-to-noise ratio.

The decoded FM monaural baseband signal is received by a stereo synthesizer 80 operable according to one of several techniques known in the art. The particular stereo synthesizer 80 used in the present embodiment delays part of the signal, which is selectively added to and subtracted from the received nondelayed signal produce a synthesized respective left and right stereo signal. The delayed and added sum and difference signals produce a pair of signals simulating left and right stereo signals, each having complementary comb-filter response, wherein the signals rejected in one channel are enhanced in the other, and vice versa.

Stereo synthesis is achieved by the above-mentioned method, and may be implemented by a variety of techniques, including the newly introduced integrated circuit TDA 3810 by Signetics of Sunnyvale, Calif. Moreover, according to techniques described by Joel M. Cohen, "Enhance TV Sound with Stereo," published in *Popular Electronics*, June 1982, pp. 55-59, describing a stereo synthesis circuit produced by Sound Concepts, Inc. of Brookline, Mass., such techniques and other methods of stereo synthesis are considered within the scope of the present invention. The resulting simulated left and right signals are amplified by conventional stereo amplifier 82 and reproduced over loudspeakers 84 and 86, according to known stereo methods and apparatus. The FM tuner 78 may also include FM-stereo demultiplexing circuitry, which will produce two identical channels of a monaural signal to the stereo synthesizer 80 when the television audio signal is monaural. Should the television audio signal contain compatible stereo subcarrier information, stereo signals will be recovered by the FM receiver, eliminating the need for the stereo synthesizer 80. Alternately, other baseband FM stereo demodulators may replace the stereo synthesizer 80, receiving their signal from the FM receiver at the detector (not shown) output.

In the particular embodiment of the present invention, the filter 58 is a surface acoustic wave (SAW) filter which has the necessary sharp cutoff characteristics. However, the SAW filter typically has a 15-20 dB insertion loss, which is compensated by the addition of one of the preceding amplifiers 54 or 56. The sharp cutoff filter 58 may be replaced by other forms of filters having the sharp cutoff characteristic necessary to prevent active adjacent channel signals, which also have a 4.5-MHz difference between the video and audio carrier signal frequencies from being included in the mixer output signals. Since the signals of interest are FM or PM modulated, the predominance of the selected channel signal over the other (adjacent) channels is necessary only to the extent needed to cause the "capture" of the desired signal known in FM technology. However, to maintain the high quality of the signal, a minimum of 20-dB rejection is desired, and a rejection of 40 dB is typically achieved by the SAW filters used.

A detailed schematic of the active mixer 64 of FIG. 1 is shown in FIG. 2. The intermodulation products are induced in the active mixer 64 according to the present invention by providing an input signal amplitude of sufficient magnitude to cause a nonlinear intermodulation between all input signals. The nonlinear condition, normally undesired as producing unwanted harmonics as a result of intermodulation and clipping distortion, is desired to produce the above-mentioned 4.5-MHz IF signal. A high-frequency silicon NPN transistor 90, typically an MPS H10 made by Motorola, Inc. of Chicago, Ill. and other manufacturers, is used in a grounded-emitter circuit, being biased to optimize its nonlinearity characteristics. The signal is received at the transistor base through an input network including capacitor 92 and inductor 94 to select the wanted input signal. The base is biased by resistors 96 and 98 to provide a base voltage at approximately one-third of the collector supply of voltage which is typically 12 volts. The emitter resistor 100, bypassed by capacitor 102, is selected to provide an operating current of 1 to 2 milliamps. A collector load inductance 104 is selected together with capacitors 106 and 108 to provide a signal coupling network having appropriate impedance and frequency bandpass characteristics necessary to pass the resulting signal at 4.5-MHz IF frequency. A capacitor 110 operates as a B+ bypass capacitor to inhibit propagation of high-frequency signals along the powered lead.

Modifications and substitutions to the present invention by one skilled in the art are within the scope of the present invention. Therefore, the present invention is not to be limited except according to the claims which follow.

What is claimed is:

1. A high-fidelity FM processor operable in response to a first signal having a plurality of subsignals therein, including a desired signal at a first frequency, and providing a signal at a second frequency, comprising:
    a first mixer for receiving only said first signal and for generating intermodulation products according to the mixing products of said subsignals;
    filter means for selectively isolating a desired intermodulation product including said desired signal from all intermodulation products produced by said first mixer means;

local oscillator means; and a second mixer receiving the output signals from said filter means and said local oscillator, and producing an output signal at said second frequency.

2. The processor of claim 1, further including input bandpass filter means receiving said first signal, and producing an output signal received by said first mixer, wherein said input bandpass filter substantially eliminates all signals except said first signal.

3. The processor of claim 2, wherein said input bandpass filter means selectively passes signals corresponding to one of the group including channels 2, 3, and 4.

4. The processor of claim 2, wherein said input bandpass filter means includes a surface acoustic wave (SAW) filter.

5. The processor of claim 1, further comprising an input amplifier providing a first frequency signal to said mixer of amplitude sufficient to cause said mixer to produce high order frequency products of said first frequency signal.

6. The processor of claim 1, further including an FM tuner providing a baseband output signal corresponding to said desired signal.

7. The processor of claim 6, wherein said local oscillator means comprises tunable local oscillator means, having an output selected to provide said second frequency to be within the broadcast range of said FM tuner.

8. The processor of claim 7, further including a noise reduction system for processing the output signal from said FM tuner providing an output signal having an improved signal-to-noise ratio.

9. The processor of claim 8, further including a stereo synthesizer receiving as an input the output signal from said noise reduction system, and producing as an output a synthesized stereo signal.

10. The processor of claim 1, wherein said first signal comprises a television signal and said first mixer comprises an active mixer operable according to a high-level input signal which causes said mixer to provide a nonlinear output representation thereof, said desired signal including a signal resulting from the combination of the video and audio carrier signals.

* * * * *